Feb. 25, 1969   J. L. GOFORTH ET AL   3,430,028
WELDING STATION
Filed Dec. 8, 1965

INVENTORS.
JOHN L. GOFORTH,
ANDREW E. FLANDERS,

United States Patent Office 3,430,028
Patented Feb. 25, 1969

3,430,028
WELDING STATION
John L. Goforth, Brea, and Andrew E. Flanders, Pomona, Calif., assignors to General Dynamics Corporation, Pomona, Calif., a corporation of Delaware
Filed Dec. 8, 1965, Ser. No. 512,396
U.S. Cl. 219—87          10 Claims
Int. Cl. B23k 9/28, 29/00, 37/02

ABSTRACT OF THE DISCLOSURE

A vacuum operated, stylus-controlled welding apparatus which utilizes a guide matrix assembly to actuate the welding apparatus while additionally providing a visual indication to verify that the desired welds have been made.

---

Various arrangements have been known in the past for guiding machine tools such as welding heads by means of a template. Such machines may have a stylus which the operator guides around or over the template. The tool and the workpiece are moved relative to each other by mechanical or electrical means linking the tool to the stylus. An example of such a tool is a cutting torch linked to a stylus by means of a pantograph to cut pieces shaped like the template from a sheet of steel or other material.

Other known template-guided machine tools make use of a template having discrete stations representing the work stations of the tool relative to the workpiece. The stations on the template may be holes formed therein. When the operator moves the stylus to a position above a hole, the stylus falls or is pushed into the hole, and this action causes the machine tool to perform its operation on the workpiece.

Unfortunately, the simple prior known stylus-and-template arrangement has a number of drawbacks. The greatest of these is the tendency of the operator to coast over a hole in the template because of the inertia of the stylus and associated linkage. Furthermore, the machine may be actuated and accidentally brought into contact with the workpiece while the workpiece is moving relative to the tool, as may happen if the stylus starts to go into a template hole and is carried past by inertia.

This invention overcomes the drawbacks of the prior known apparatus described above by providing a vacuum operated, stylus controlled arrangement wherein the stylus must puncture a weld locator card in order to initiate the weld cycle, the card additionally providing a check to determine if every weld had been made.

Therefore, it is an object of this invention to provide a stylus controlled welding apparatus.

A further object of the invention is to provide a vacuum actuated, stylus controlled welding apparatus.

Another object of the invention is to provide a multiple head welding apparatus for simultaneously welding components of a plurality of electronic modules.

Another object of the invention is to provide a multiple head welding apparatus capable of producing surface type welds which utilizes a stylus-guide matrix-pantograph arrangement for locating the workpiece or workpieces to be welded with respect to the welding heads.

Another object of the invention is to provide a vacuum operated, stylus controlled welding apparatus which utilizes a guide matrix having a weld record card therein, whereby puncture of the card by the stylus serves to actuate the welding apparatus while additionally providing a visual indication to verify that the desired welds have been made.

Other objects of the invention not specifically set forth above will become readily apparent from the following description and accompanying drawings wherein.

Figure 1:
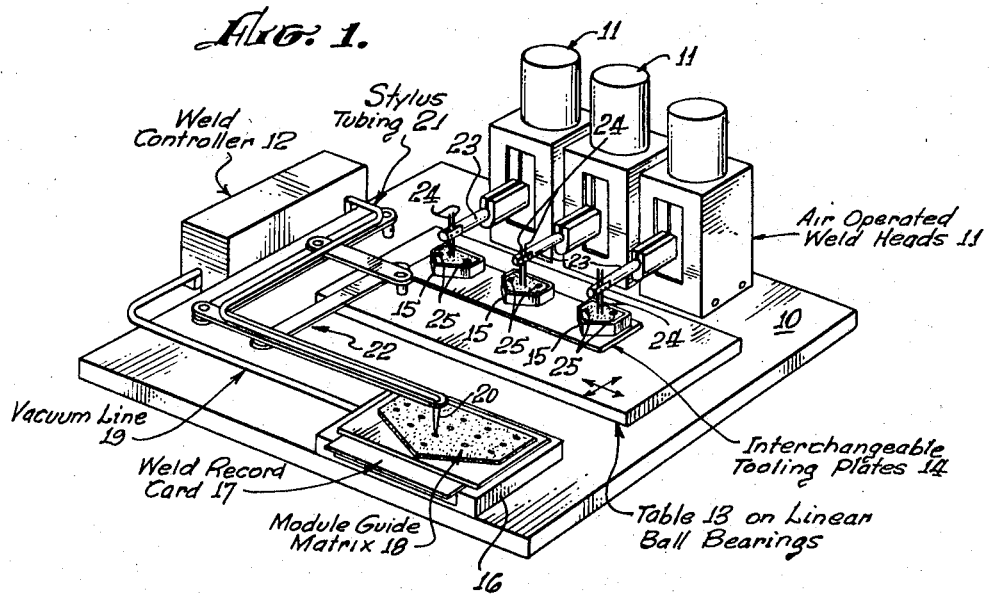
FIG. 1 is an isometric view illustrating an embodiment of the invention.

In general, the invention as illustrated is directed to a welding apparatus adapted for working on electronic modules comprising a plurality of welding heads which are pneumatically operated via a weld control unit in response to signals emanating from a manually operable stylus and guide matrix arrangement. The guide matrix is in the form of a vacuum chamber having a plurality of apertures in a top surface thereof. Positioned in the guide matrix is a card or the like which normally prevents flow through the apertures. The apertures in the guide matrix are formed such that they form the desired weld pattern to be applied to an electronic module or other item to be welded. Connected to the manually operable stylus is a pantograph which is in turn connected to a work holder which is mounted on ball bearings or the like. The arrangement is such that as the stylus is moved from one guide aperture to the next in the guide matrix, the work table is moved accordingly via a pantograph. The stylus is of a hollow construction and is formed with a forward cutting edge such that insertion of the stylus through one of the apertures causes the card to be punctured, which opens the stylus connected tubing to a vacuum which operates a switch to initiate the weld cycle. After the completion of welding, the card provides an immediately available record that every weld has been completed.

Referring now to the drawings, the illustrated embodiment of this invention comprises a weld station located on a support or work sruface 10, the station including generally a plurality of air operated weld heads 11 (3 being shown), a weld controller 12, a table 13 supported on surface 10 via ball bearings, Teflon treated surfaces, or other suitable slides (none of which are shown), an interchangeable tooling plate 14 upon which workpieces such as electronic modules 15 are mounted, a guide matrix assembly 16 having a weld record card 17 positioned therein, a module guide matrix or template 18 thereon and connected to weld controller 12 via vacuum tubing 19, and a stylus 20 interconnected with the weld controller 12 via tubing 21 and to table 13 via a pantograph 22, the stylus 20 being located above module guide matrix 18.

While the weld heads 11 have been illustrated as being of the air operated type they may be constructed in other conventional manner. The weld heads 11 operate in conventional manner in response to signals from the weld controller 12 which is in turn actuated by vacuum created therein when the stylus 20 punctures the card 17, as described hereinafter, thus interconnecting the controller 12 with a source of vacuum (not shown) via tubing 21, stylus 20, guide matrix assembly 16 and vacuum supply line 19. Weld heads 11 each include a lever or arm 23 which holds a pair of electrodes 24 which are connected to an electrical power source (not shown), arm 23 being lowered in response to signals from weld controller 12, whereby a surface type weld, for example, is produced on module 15 by the electrodes 24. A description and purpose of a surface type weld will become more apparent hereinafter. Electrodes 24 may be comprised of a split electrode, if desired.

Modules 15 are retained in a desired position on tooling plate 14 by means of pins or dowels or the like (not shown) which extend upwardly into registration tubes or holes 25 in the modules. The modules 15 may be constructed, for example, in the manner described and claimed in copending U.S. patent application Ser. No. 461,045 filed June 3, 1965 and assigned to the same assignee.

A surface type weld is a weld produced by applying welding electrodes to a material, for example nickel, which has a fusible material, such as gold or a suitable alloy, plated or coated on the surface adjacent the point to be welded. When the temperature is raised to a predetermined point, diffusion and partial fusion take place between the base material being welded and the fusible material thereby producing a weld which is high in shear strength but can be readily removed by a peeling action without damage to the components being interconnected, thus producing a repairable weld joint. The electrodes may be applied on the same or opposite sides of the joint.

Figure 2:
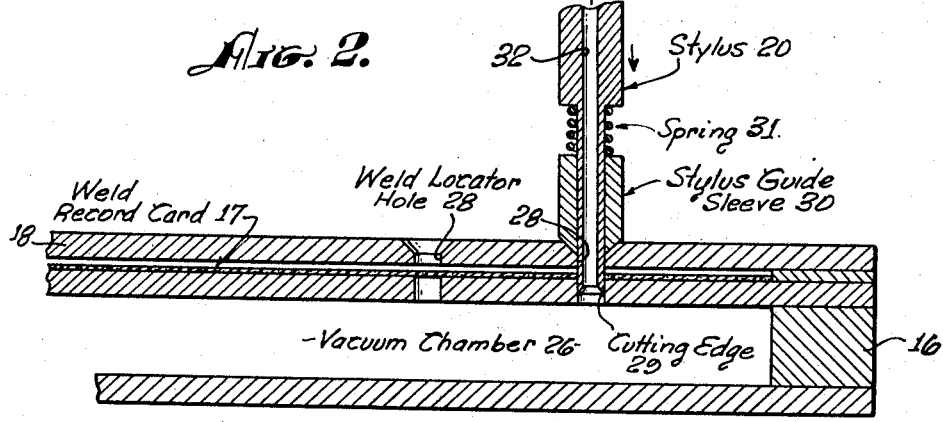
FIG. 2 is a partial cross-sectional view of the stylus mechanism, guide matrix and weld card of the invention shown in the actuated position.

As shown in FIG. 2, the guide matrix assembly 16 includes a housing having a vacuum chamber 26 therein which is in communication via vacuum line 19 and weld controller 12 with a vacuum source (not shown). The upper surface of the matrix assembly housing is provided with a plurality of apertures 27 which align with apertures or weld locator holes 28 in the module guide or template 18. The weld record card 17 is located between the apertures 27 and locator holes 28 for the purpose set forth hereinbelow.

The stylus 20, as shown in FIG. 2 includes a cutting edge 29 which is positioned within and extending from a guide sleeve 30 which is spring biased at 31. An internal bore 32 extends throughout the stylus and is connected to the stylus tubing 21 (see FIG. 1) which is connected with a vacuum switch in weld controller 12 as indicated by legend in FIG. 2. The guide sleeve 30 is tapered at the lower end to cooperate with a tapering countersink in the weld locator holes 28 of guide 18 for guiding the cutting edge 29 into hole 28 as shown in FIG. 2 wherein the cutting edge punctures weld card 17 and extends into aperture 27 thereby providing vacuum communication between the vacuum switch in weld controller 12 and the vacuum chamber 26, thus actuating the welder heads 11.

The weld locator card 17 while serving as a vacuum seal between vacuum chamber 26 and stylus 20 may be brightly colored to readily assist the operator in determining which holes 28 that the stylue 20 has not been inserted into, thus assuring that all the required welds have been made when the card 17 is fully punctured. The card may be pre-marked at each place of puncture and a viewing of the card after the welding operation has been completed will serve to assure that all welds have been made with the card serving as a record, if desired.

In operation, the operator moves the stylus 20 over the module guide or template 18, the position of table 13 is correspondingly established through the linkage of pantograph 22, table 13 being moved to locate the modules 15 in a position with respect to the welder electrodes 24 which directly corresponds to the location of the stylus with respect to a weld locator hole 28 in guide 18. The operator inserts the stylus 20 in a weld locator hole 28, as shown in FIG. 2, wherein the cutting edge 29 of the stylus punctures the card 17 and extends into aperture 27, thus opening the stylus tubing 21 to the vacuum in chamber 26 which operates a switch in weld controller 12 to initiate the weld cycle of welding heads 11. The stylus is similarly moved to each locator hole 28 of guide 18 thus completing all the welds to be made on the modules 15, whereafter the card 17 is removed, inspected to assure that each weld has been made, and filed for future reference, if desired.

Different guides or templates 18 may be positioned on matrix assembly 16 for different weld locations on like shaped modules 15, or different configured modules or tooling plates may be utilized depending on the welding to be performed.

It is thus seen that this invention provides a welding apparatus which not only assists the operator in making properly located welds by the use of the enlarged guide or template with the bright colored card thereunder and associated stylus, pantograph and table arrangement, but additionally provides a means of preventing an undesirably located weld while providing a record of the welds made for either immediate check or for future record.

While the weld station has been illustrated and described as utilizing welder heads of the series or parallel gap resistance type, this invention is also applicable with beam type welders, such as focused IR, laser and electron beam.

Although a particular embodiment of the invention has been illustrated and described, modifications and changes will become apparent to those skilled in the art, and it is intended to cover in the appended claims, all such changes and modifications as come within the true spirit and scope of the invention.

What we claim is:

1. A welding station comprising, welding mechanism, a control unit operatively connected to said welding mechanism and adapted for controlling said welding mechanism, a guide matrix assembly operatively connected to said control unit through a source of vacuum, a stylus operatively connected to said control unit, said stylus operatively associated with said guide matrix assembly for actuating said control unit, means operatively connected to said stylus adapted for positioning at least one workpiece to be welded by said welding mechanism, and means operatively positioned in said guide matrix assembly for normally preventing said control unit from being actuated.

2. The welding station defined in claim 1, wherein said welding mechanism includes a plurality of welding heads.

3. The welding station defined in claim 2, wherein said welding heads are pneumatically operated.

4. The welding station defined in claim 1, wherein said first mentioned means includes a pantograph and a table means supported on friction reducing means.

5. The welding station defined in claim 1, wherein said workpiece to be welded is an electronic module.

6. The welding station defined in claim 1, wherein said guide matrix assembly includes a housing defining a vacuum chamber and having a plurality of apertures in one surface thereof.

7. The welding station defined in claim 6, wherein said guide matrix assembly additionally includes a guide means having locator holes therein which are so positioned to correspond with the desired welding locations on an associated workpiece, said locator holes being located adjacent to certain of said plurality of apertures in said housing.

8. The welding station defined in claim 7, wherein said control unit actuation preventing means comprises a weld card means positioned between said locator holes in said guide means and said apertures in said housing.

9. The welding station defined in claim 8, wherein said stylus is configured so as to enter said locator holes, puncture said weld card and interconnect said vacuum chamber with said control unit for actuating said welding mechanism.

10. The welding station defined in claim 1, wherein said last mentioned means comprises a card means so constructed as to provide a method of determining that all the desired welds on an associated workpiece had been initiated.

References Cited

UNITED STATES PATENTS

| | | | |
|---|---|---|---|
| 1,923,208 | 8/1933 | Howey | 33—25 |
| 3,037,888 | 6/1962 | Lobosco et al. | 148—9 |

RICHARD M. WOOD, *Primary Examiner.*

P. W. MAY, *Assistant Examiner.*

U.S. Cl. X.R.

219—86, 108